Patented Sept. 12, 1939

2,173,066

UNITED STATES PATENT OFFICE 2,173,066

α-HALOGENVINYLKETONE

Lothar Walter Metzger, Cologne-Deutz, and Otto Bayer, Leverkusen-I. G. Werk, Germany, assignors to I. G. Farbenindustrie Aktiengesellschaft, Frankfort-on-the-Main, Germany No Drawing. Application August 3, 1938, Serial No. 222,757. In Germany August 3, 1937

2 Claims. (Cl. 260—63)

The present invention relates to α-halogenvinylmethylketones and to the polymerization products thereof.

It has been found that α-halogenvinylmethylketones can be prepared in a good yield by causing hypochlorous acid or hypobromous acid to react upon vinylmethylketone and splitting off water from the condensation products thus obtained. The first step of the reaction can be effected in an aqueous medium. To this end, the vinylmethylketone serving as starting material is preferably emulsified in water, chlorine or bromine being gradually added thereto. As the reaction proceeds under self-heating, care must be taken by cooling to avoid an excessive rise of temperature. A temperature of about 30° C. may be given as upper limit. The simplest method of splitting off water from the α-halogenketobutanol which is formed as intermediate product consists in subjecting the reaction mixture to vapor distillation, the α-halogenvinylmethylketone distilling over in form of a water insoluble oil.

The α-halogenvinylmethylketones are capable of being polymerized even on standing. The polymeric products are solid and nearly colorless. Moreover, they represent valuable intermediate products for various reactions.

The following examples illustrate the present invention without, however restricting it thereto the parts being by weight:

Example 1

70 parts of vinylmethylketone are emulsified in 1000 parts of water while thoroughly stirring, whereupon there are introduced within one hour at 5–10° 71 parts of chlorine while cooling. A colorless and nearly odorless solution is thus formed containing at the bottom a small quantity of a heavy oil. This by-product represents α-β-dichloroethylmethylketone which boils at 57° at 14 mm. pressure. The α-chloroketobutanol is isolated by saturating the aqueous solution by means of sodium chloride and then extracting it with organic solvents. On distilling off the solvent the final product is obtained in form of a yellow sirupy mass in a yield of 115 parts. The α-chlorovinylmethylketone can be transformed into the said aqueous solution by distilling it with vapor, the α-chlorovinylmethylketone being converted into a yellow oil heavier than water. After separating the layers and drying the oil with calcium chloride the product can be purified by distillation under reduced pressure. The α-chlorovinylmethylketone shows a very high tendency to polymerize; it boils at 22–30° under 13 mm. pressure.

Example 2

Into 1000 parts of water there are introduced while thoroughly stirring and cooling during 4 hours about 70 parts of vinylmethylketone and 160 parts of bromine, the reaction temperature being kept during this time at 10–15°. Thereupon the reaction mixture is distillated by means of vapor. 105 parts of a light-yellow, heavy oil, the major part of which consists of α-bromovinylmethylketone, can be separated from the distillate.

We claim:
1. α-halogenvinylmethylketones wherein the halogen is a member of the group consisting of chlorine and bromine.
2. Polymeric α-halogenvinylmethylketones wherein the halogen is a member of the group consisting of chlorine and bromine.

LOTHAR WALTER METZGER.
OTTO BAYER.